United States Patent [19]

Föhl

[11] 4,183,476
[45] Jan. 15, 1980

[54] WIND-UP ROLLER FOR SAFETY BELTS

[75] Inventor: Artur Föhl, Haubersbronn, Fed. Rep. of Germany

[73] Assignee: Repa Feinstanzwerk GmbH, Alfdorf, Fed. Rep. of Germany

[21] Appl. No.: 864,477

[22] Filed: Dec. 27, 1977

[30] Foreign Application Priority Data

Dec. 30, 1976 [DE] Fed. Rep. of Germany ....... 2659644

[51] Int. Cl.² .................. B65H 75/48; A62B 35/00
[52] U.S. Cl. ......................... 242/107; 242/107.4 R
[58] Field of Search ............... 242/107, 107.4 RE; 280/744–747; 297/388

[56] References Cited

U.S. PATENT DOCUMENTS

| | | | |
|---|---|---|---|
| 3,984,063 | 10/1976 | Knieriemen | 242/107 |
| 4,026,494 | 5/1977 | Tanaka | 242/107 |
| 4,081,153 | 3/1978 | Tanaka et al. | 242/107 |

Primary Examiner—Harvey C. Hornsby
Assistant Examiner—John M. Jillions
Attorney, Agent, or Firm—Herbert L. Lerner

[57] ABSTRACT

A safety belt wind-up roller includes a winding shaft for a safety belt, a rewind spring operatively connected to the winding shaft for rewinding the safety belt after it has been withdrawn, a compensating device for equalizing the restoring force of the rewind spring as the restoring force increases with increasing withdrawal of the safety belt, and a coupling member operatively associated with the winding shaft for rotation therewith, and the compensating device has a compensating member in the form of a roll spring mounted axially parallel to the winding shaft and having a radially outer end forcibly engageable with the coupling member during rotation of the winding shaft over a predetermined rotary angle as the safety belt is being rewound.

7 Claims, 14 Drawing Figures

WIND-UP ROLLER FOR SAFETY BELTS

The invention relates to wind-up rollers for safety belts in motor vehicles and, more particularly, to such wind-up rollers having a rewind spring acting upon a winding shaft for the belt, and a compensation device for equalizing the restoring force of the spring as the restoring force increases with increasing withdrawal of the belt.

By means of such compensation devices, the uncomfortably experienced pressure exerted by the belt upon the body of the person to be safely secured, and which is contingent upon the adjusting force of the rewind spring, is supposed to be minimized or eliminated. If the adjusting force of the rewind spring should be reduced to an extent that the belt pressure is no longer experienced as uncomfortable, there would no longer be any assurance that the belt would be completely rewound when it is taken off.

Various types of spring drives with equalization transmission have therefore already been proposed heretofore for reducing the belt pressure. These compensation devices are, however, very costly to construct, tend to be susceptible to trouble and require an amount of space which is usually not available in practice.

Devices have also been proposed heretofore by means of which the belt, after being withdrawn and slowly rewound, is blocked and, accordingly, the adjusting force of the rewind spring is eliminated.

Such devices have the considerable disadvantage, however, that large lengths of loosened or released belt appear which considerably reduce the safety function of the belt.

It is accordingly an object of the invention to provide a safety belt wind-up roller of the foregoing general type wherein the compensation device is of simple and space-saving construction. Moreover, it is an object of the invention to provide such a wind-up roller which prevents the formation of too-large lengths of loosened or released belt.

With the foregoing and other objects in view, there is provided, in accordance with the invention, in a safety-belt wind-up roller having a winding shaft for a safety belt, a rewind spring operatively connected to the winding shaft for rewinding the safety belt after it has been withdrawn, and a compensating device for equalizing the restoring force of the rewind spring as the restoring force increases with increasing withdrawal of the safety belt, a coupling member operatively associated with the winding shaft for rotation therewith, and the compensating device comprising a compensating member in the form of a roll spring mounted axially parallel to the winding shaft and having a radially outer end forcibly engageable with the coupling member during rotation of the winding shaft over a predetermined rotary angle as the safety belt is being rewound.

Through the inventive disposition of a roll spring and a coupling member, the adjusting force of the rewind spring is largely eliminated within a predetermined range of rotation of the winding shaft, such as 300°, for example. If too-great a loosened length of the belt is produced, the roll spring, with further rewinding of the belt, is freed or released again and the compensation effect is consequently discontinued. The user must, in such a case, withdraw a short length of the belt anew so that the compensation device becomes effective again. The withdrawn belt length is again rewound with the adjusting force of the rewind spring reduced by the opposing force of the roll spring, so that the belt with only slight pressure and without any loosened belt length is in engagement with the body of the user.

In accordance with another feature of the invention, the roll spring is mounted in a cassette-like reception chamber, the radially outer end of the roll spring projecting out of the chamber and through a slot-shaped guide into vicinity of the coupling member.

In accordance with a further feature of the invention, the safety belt wind-up roller includes a pivotable control lever frictionally connected to the coupling member, and stop means located in vicinity of the guide and associated with the control lever for limiting the pivot angle thereof, the control lever having a clamping member cooperating with the coupling member for forcibly clamping therebetween the radially outer end of the roll spring during rewinding of the safety belt and for again releasing the radially outer end of the roll spring after rotation of the winding shaft through a predetermined angle of rotation.

In accordance with an added feature of the invention, the coupling member is a gear with toothing formed thereon, the radially outer end of the roll spring being rolled in direction toward the toothing of the coupling member so that the rolled-in end of the roll spring can engage in the coupling member with a form-locking fit.

In accordance with an additional feature of the invention, the clamping member which binds the end of the roll spring to the coupling member comprises a roller mounted parallel to the winding shaft in guidance grooves formed in the control lever, the guidance grooves being disposed at an acute angle to the end of the roller spring tangentially to the coupling member.

In accordance with yet another feature of the invention, the coupling member is of disc-shaped construction, and the clamping member comprises an eccentric mounted at the free end of the control lever and engageable with the radially outer end of the roll spring for forcing the outer end toward the coupling member, the stop being disposed as an adjusting member within the pivot range of the control lever.

For instances of use wherein the compensation device is to be effective for a greater range than one rotation of the winding shaft, there is provided, in accordance with yet a further feature of the invention, transmission gearing disposed between and operatively connected to the winding shaft and the coupling member.

In accordance with another feature of the invention, in rest position of the wind-up roller, the radially outer end of the roll spring is looped about the coupling member through an angle $\alpha$ which is such that a band braking effect resulting from the value $e^{\mu\alpha}$ is adequate for unwinding the roll spring, where $\mu$ represents the coefficient of friction.

In order to ensure the return of the roll spring into the cassette-like reception chamber, there is provided, in accordance with a concomitant feature of the invention, that the guide through which the roll spring is withdrawn has an outer flank end lying below which is resiliently mounted. It is possible, however, through suitable shaping of the inner end of the roll spring, to ensure the return thereof to the reception chamber without any resiliently constructed guide flank. Other features which are considered as characteristic for the invention are set forth in the appended claims.

Although the invention is illustrated and described herein as embodied in wind-up roller for safety belts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Referring now to the drawings and first, particularly, to FIGS. 1 to 6, there is shown therein a safety belt wind-up roller having a winding or coil shaft 2 for a safety belt 3 mounted in a bearing block or bracket 1. A rewind spring 23 mounted in a housing 4 serves for rewinding the belt 3 on the winding shaft 2. A disc-shaped coupling member 6 formed with external toothing 7 is nonrotatably disposed on an elongation or extension 5 of the winding shaft 2. A control lever 9 is rotatably disposed about a collar 8 of the coupling member 6 and is biased by a spring 10 into frictional connection with the coupling member 6. In a cassette-like reception chamber 11, a spiral or roll spring 12 is mounted and has an outer end 13 which protrudes through a slot-shaped guide 14 tangentially into the vicinity of the coupling member 6. The control lever 9 is formed with guidance grooves 15 for a roller-shaped clamping member 16 at an end of the control lever 9 which projects beyond the coupling member 6, the guidance grooves 15 being disposed at an acute angle to the tangent located perpendicularly to the plane passing through the winding shaft 2 and the clamping member 16. The free spring end 13 is rolled in direction towards the toothing of the coupling member 6.

Figure 1:
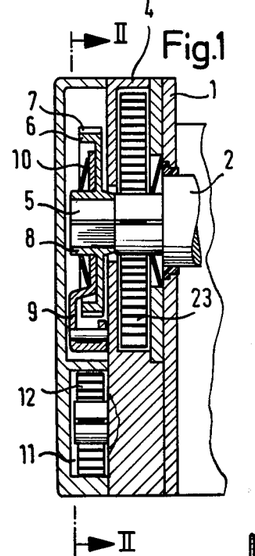
FIG. 1 is a sectional view of a first embodiment of the safety belt wind-up roller according to the invention taken along the line I—I in FIG. 2 in direction of the arrows.
Figure 2:
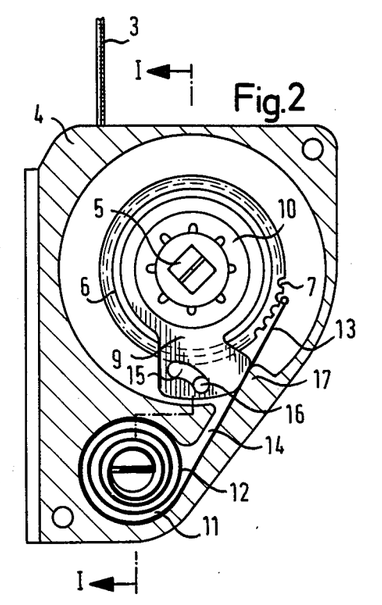
FIG. 2 is a sectional view of FIG. 1 taken along the line II—II in direction of the arrows and showing the wind-up roller in starting position thereof.

At the start of the withdrawal of the belt 3, the control lever 9 is located in the position thereof illustrated in FIG. 2, wherein it engages a stop or abutment 17 limiting the swing or pivot path thereof.

As the belt withdrawal progresses, the control lever 9 reaches the position thereof shown in FIG. 3 wherein it again, although on the other side thereof, strikes against the stop or abutment 17. In the end phase of the swinging or pivoting movement of the control lever 9, the clamping member 16 travels toward the end of the guidance grooves 15 located closer to the coupling member 6. The spring end 13 is accordingly forced so far toward the coupling member 6 that the rolled-in end thereof engages the toothing 7. Upon rewinding the belt 3 in accordance with the view in FIG. 4, the spiral or roll spring 12 is withdrawn out of the reception chamber 11 and the adjusting force of the rewind spring 23 is thereby largely compensated.

Figure 5:
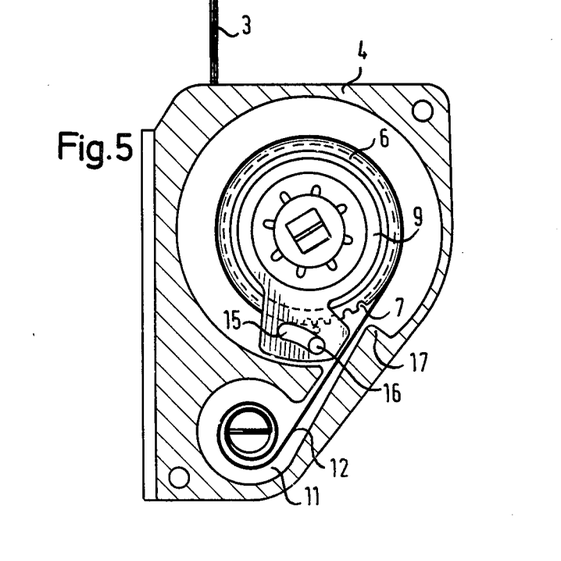
Figure 6:
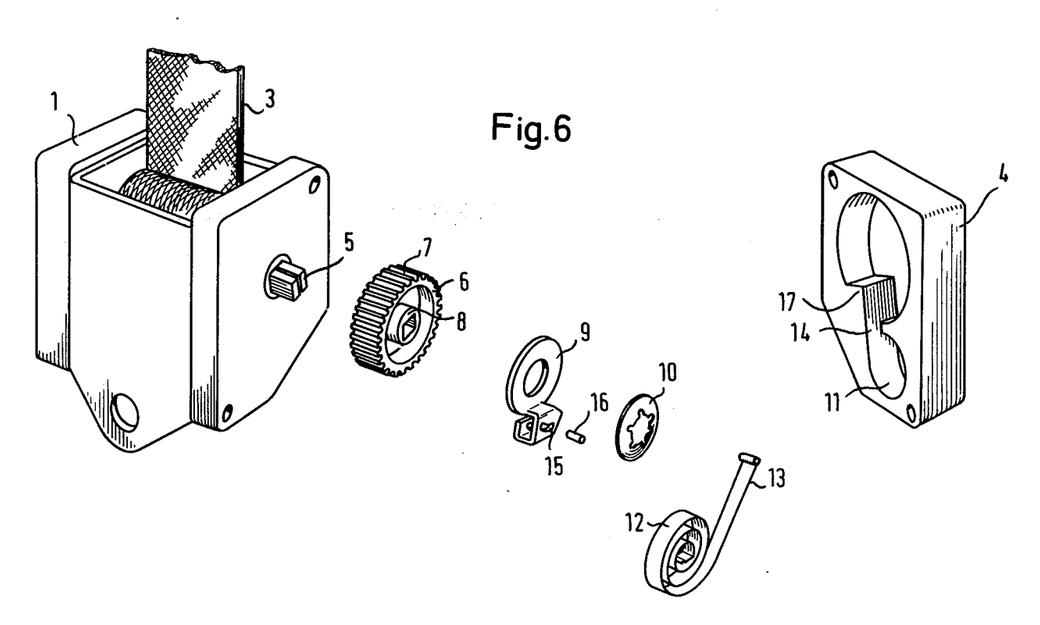
FIG. 6 is an exploded perspective view of the embodiment of the safety belt wind-up roller shown in FIGS. 1 to 5.

If too great a belt loosening or length has been withdrawn from the belt winding, the control lever 9 reaches the position thereof illustrated in FIG. 5. In this regard, the clamping member 16 again travels back to the starting position thereof so that the free spring end 13 is released and the roll spring can rewind into the original position thereof shown in FIG. 2. The compensation action is accordingly ended and the belt 3 is rewound until no loosened belt length is present any more.

Through renewed withdrawal of the belt in accordance with substantially one rotation of the winding shaft 2, the position of the control lever 9 shown in FIG. 3, can again be attained and, accordingly, the compensation process introduced anew, in the course of which the rewinding does not occur to such an extent that the spring end 13 is again released.

Figure 3:
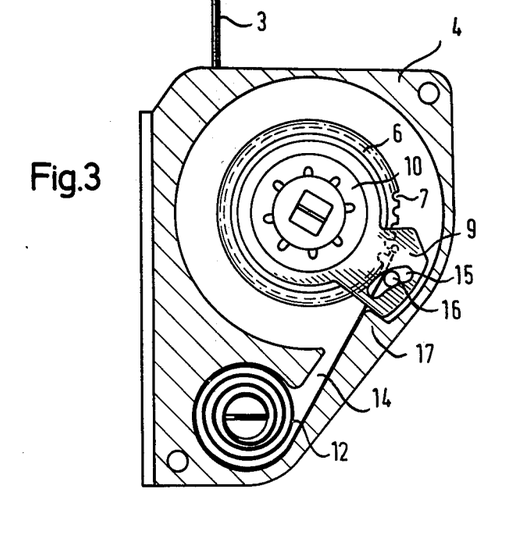
FIGS. 3, 4 and 5 are views corresponding to that of FIG. 2 but showing the wind-up roller in different modes of the operation thereof, namely in the clamping position, at the beginning of the compensation action and at the releasing position thereof, respectively.
Figure 4:
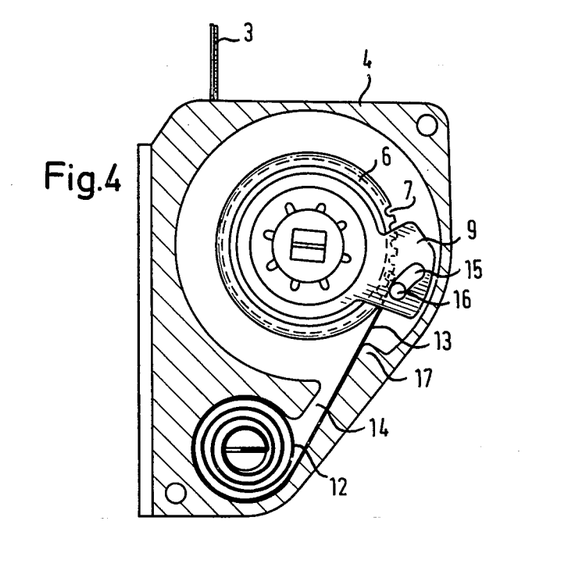
Figure 7:
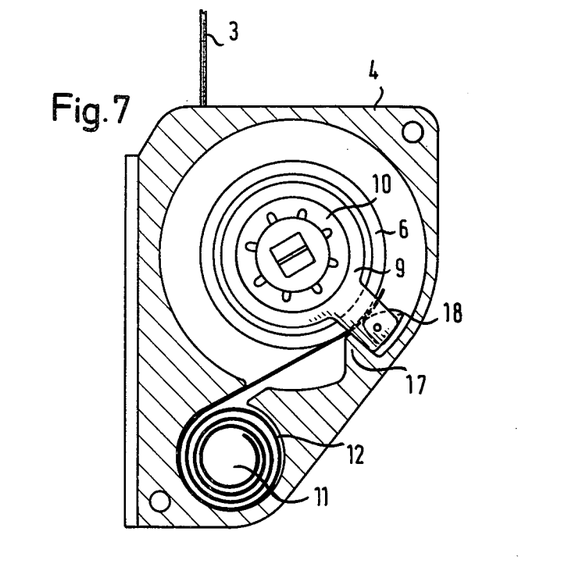
FIG. 7 is a view corresponding to that of FIG. 2 of a second embodiment of the safety belt wind-up roller with an eccentric as clamping element, and showing the wind-up roller in clamping position.
Figure 8:
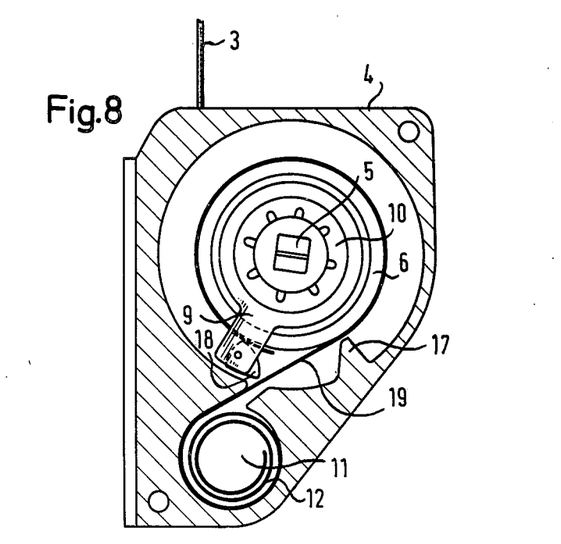
FIG. 8 is a view corresponding to that of FIG. 7 showing the second embodiment of the invention in a mode thereof just before the releasing position thereof.

In FIGS. 7 and 8, a member in the form of a rotatably mounted eccentric 18 is disposed at the free end of the control lever 9 instead of a roller-shaped clamping member, the eccentric 18 firmly clamping the free end 13 of the roll spring 12, in a manner similar to that shown in FIG. 3, against the external surface of the coupling member 6 which, in the embodiment of FIGS. 7 and 8, is smooth i.e. not formed with external toothing. The release of the free end 13 of the roll spring 12 is effected in accordance with the view of FIG. 8 by the fact that the eccentric 18, at the end of the swing or pivot path of the control lever 9, runs up onto the stressed part 19 of the roll spring 12.

Figures 9, 9A:
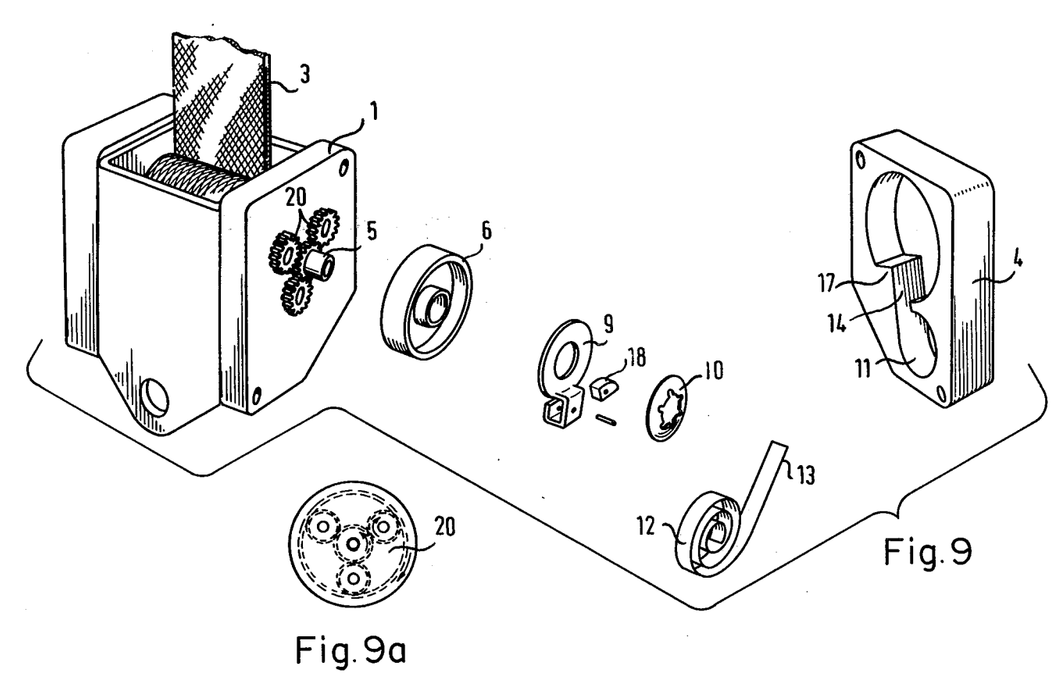
FIG. 9 is an exploded perspective view of a third embodiment of the invention with transmission gearing.
FIG. 9a is a front elevational view showing a portion of the embodiment of FIG. 9 in assembled condition.

The embodiment shown in exploded view in FIG. 9 and partially assembled in FIG. 9a, has transmission gearing 20 disposed between the elongation or extension 5 of the winding shaft 2 and the coupling member 6. By means of this gearing 20, it is possible to extend the compensation process over more than one rotation of the winding shaft 2.

Figure 10:
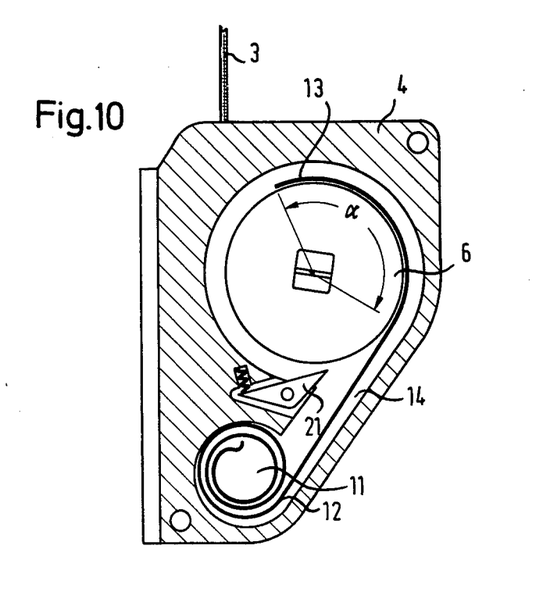
FIG. 10 is a view corresponding to that of FIG. 2 of a fourth embodiment of the invention without control levers and with spring-mounted guidance flanks in starting-position mode of operation.
Figure 11:
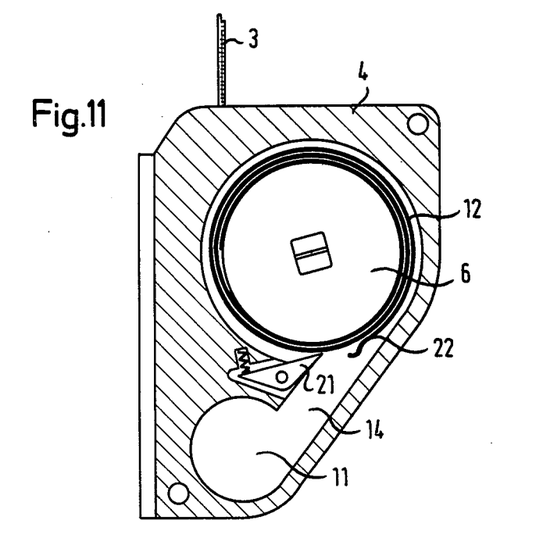
FIG. 11 is a view corresponding to that of FIG. 10 showing the fourth embodiment in another mode of operation, namely the end position thereof.

FIGS. 10 and 11 illustrate an embodiment of the invention without any control lever. The free end 13 of the roll spring 12 loops about a winding or partial turn α, in the starting position of the coupling member 6, which is of such length that a band braking effect of the value $e^{\mu\alpha}$ results which is adequate for unwinding the roll spring 12 when the belt 3 is rewound. In this regard, a braking value is set which compensates the adjusting force of the rewind spring 23 to such an extent that the bearing pressure of the belt 3 upon the user thereof acts no longer unrestrictedly.

The compensation effect of the roll spring 12 persists as long as the roll spring 12 has not yet been withdrawn entirely from the reception chamber 11 (FIG. 11). Through renewed unwinding of the belt 3, the spring 12 is again returned into the reception chamber 11, the threading of the inner thread end 22 being facilitated by spring-mounting the outer flank end member 21 disposed on the guide 14 lying below the flank end member 21.

Figure 12:
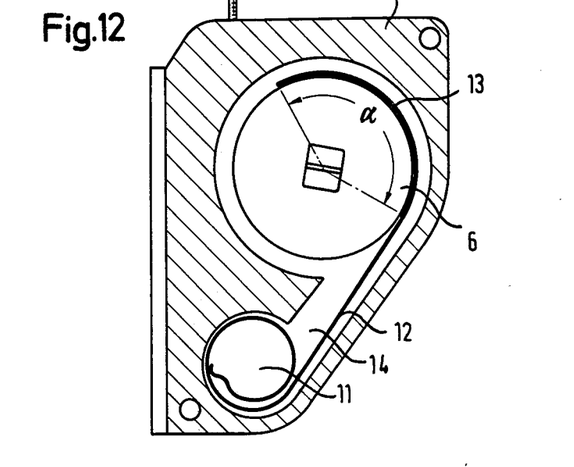
FIG. 12 is a view corresponding to that of FIG. 10 of a fifth embodiment of the invention without any spring-mounted guidance flanks.
Figure 13:
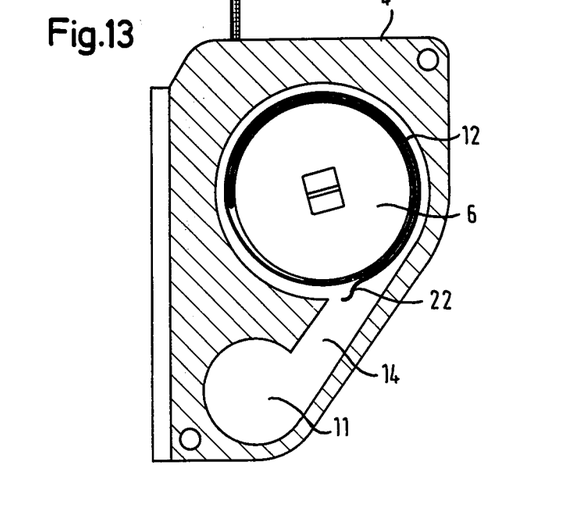
FIG. 13 is a view corresponding to that of FIG. 11 of the fifth embodiment without spring-mounted guidance flanks.

In accordance with the views in FIGS. 12 and 13, the return of the spring 12 can also be assured through suitable shaping of the inner end 22 of the roll spring 12.

It is within the scope of the invention to install both right-hand or left-hand spiral roll springs. Moreover, the heart of the spring can be disposed selectively lying exposed or stored in a pin or plug.

There is claimed:

1. In a safety belt wind-up roller having a winding shaft for a safety belt, a rewind spring operatively connected to the winding shaft for rewinding the safety belt after it has been withdrawn, and a compensating device for equalizing the restoring force of the rewinding spring as the restoring force increases with increasing withdrawal of the safety belt, a coupling member coupled to the winding shaft for rotation therewith, and the compensating device comprising a compensating member in the form of a roll spring mounted axially parallel to the winding shaft and having a radially outer end forcibly engageable with said coupling member during rotation of the winding shaft over a predetermined rotary angle as the safety belt is being rewound, said roll spring providing a spring force on the winding shaft through said coupling member in unwinding direction of the safety belt, said roll spring being mounted in a cassette-like reception chamber, said radially outer end of said roll spring projecting out of said chamber and through a slot-shaped guide into vicinity of said coupling member, and including a pivotable control lever frictionally connected to said coupling member, and stop means located in vicinity of said guide and associated with said control lever for limiting the pivot angle thereof, said control lever having a clamping member cooperating with said coupling member for forcibly clamping therebetween said radially outer end of said roll spring during rewinding of the safety belt and for again releasing said radially outer end of said roll spring after rotation of the winding shaft through a predetermined angle of rotation.

2. Safety belt wind-up roller according to claim 1 wherein said coupling member is a gear with toothing formed thereon, said radially outer end of said roll spring being rolled in direction toward said toothing of said coupling member.

3. Safety belt wind-up roller according to claim 2 wherein said clamping member comprises a roller mounted parallel to the winding shaft in guidance grooves formed in said control lever, said guidance grooves being disposed at an acute angle to a tangent disposed perpendicularly to a plane passing through the winding shaft and said clamping member.

4. Safety belt wind-up roller according to claim 1 wherein said coupling member is of disc-shaped construction, and said clamping member comprises an eccentric mounted at the free end of said control lever and engageable with said radially outer end of said roll spring for forcing said outer end toward said coupling member.

5. Safety belt wind-up roller according to claim 1 including transmission gearing disposed between and operatively connected to the winding shaft and said coupling member.

6. In a safety belt wind-up roller having a winding shaft for a safety belt, a rewind spring operatively connected to the winding shaft for rewinding the safety belt after it has been withdrawn, and a compensating device for equalizing the restoring force of the rewind spring as the restoring force increases with increasing withdrawal of the safety belt, a coupling member coupled to the winding shaft for rotation therewith, and the compensating device comprising a compensating member in the form of a roll spring mounted axially parallel to the winding shaft and having a radially outer end forcibly engageable with said coupling member during rotation of the winding shaft over a predetermined rotary angle as the safety belt is being rewound, said roll spring providing a spring force on the winding shaft through said coupling member in unwinding direction of the safety belt, said roll spring being mounted in a cassette-like reception chamber, said radially outer end of said roll spring projecting out of said chamber and through a slot-shaped guide into vicinity of said coupling member and, in rest position of the wind-up roller, said radially outer end of said roll spring being looped about said coupling member through an angle $\alpha$ which is such that a band braking effect resulting from the value $e^{\mu\alpha}$ is adequate for unwinding the roll spring.

7. Safety belt wind-up roller according to claim 6 including a resiliently mounted flank end member disposed on said guide.

* * * * *